(12) United States Patent
Best et al.

(10) Patent No.: US 8,095,883 B2
(45) Date of Patent: Jan. 10, 2012

(54) INDICATING THE DEFAULT VALUE FOR A PROPERTY TO ENHANCE USER FEEDBACK

(75) Inventors: Casey A. Best, Whitby (CA); Joseph M. Jaquinta, Medford, MA (US); Steven A. Shewchuk, Victoria (CA)

(73) Assignee: International Business Machines Corporation, Armonk, NY (US)

( * ) Notice: Subject to any disclaimer, the term of this patent is extended or adjusted under 35 U.S.C. 154(b) by 998 days.

(21) Appl. No.: 11/833,347

(22) Filed: Aug. 3, 2007

(65) Prior Publication Data

US 2009/0037831 A1    Feb. 5, 2009

(51) Int. Cl.
  *G06F 3/048* (2006.01)
(52) U.S. Cl. .................. 715/764; 715/811; 715/813
(58) Field of Classification Search .................. 715/764, 715/813, 811
  See application file for complete search history.

(56) References Cited

U.S. PATENT DOCUMENTS

| 7,107,546 B2* | 9/2006 | Coulthard | 715/780 |
|---|---|---|---|
| 7,278,168 B1* | 10/2007 | Chaudhury et al. | 726/30 |
| 7,493,568 B2* | 2/2009 | Magendanz et al. | 715/771 |
| 7,500,201 B2* | 3/2009 | Treibach-Heck et al. | 715/780 |
| 7,548,238 B2* | 6/2009 | Berteig et al. | 345/426 |
| 2002/0186257 A1* | 12/2002 | Cadiz et al. | 345/838 |
| 2003/0222918 A1* | 12/2003 | Coulthard | 345/780 |
| 2005/0149545 A1* | 7/2005 | Zenz | 707/101 |
| 2007/0078735 A1* | 4/2007 | Wan et al. | 705/28 |
| 2009/0037831 A1* | 2/2009 | Best et al. | 715/764 |

* cited by examiner

*Primary Examiner* — William Bashore
*Assistant Examiner* — David Phantana Angkool
(74) *Attorney, Agent, or Firm* — Cantor Colburn LLP; Libby Toub

(57) ABSTRACT

A system for indicating a default value for a property of a selected object to a user within a graphical user interface (GUI) of a program module is provided. The property has a value and a state that can be set. The state of the property is one of a default state and a user-set state. The value of the property is assigned the default value when the state is the default state. The system comprises a GUI control having first, second, and third interface elements. The first interface element is configured to indicate the value of the property to the user. The second interface element is configured to indicate the state of the property to the user. The third interface element is configured to indicate the default value for the property to the user when the state of the property is the user-set state.

14 Claims, 4 Drawing Sheets

INDICATING THE DEFAULT VALUE FOR A PROPERTY TO ENHANCE USER FEEDBACK

CROSS-REFERENCE TO RELATED APPLICATIONS

This application contains subject matter which is related to the subject matter of the following co-pending application, which is assigned to the same assignee, International Business Machines Corporation of Armonk, N.Y., as this application. The below listed application is hereby incorporated herein by reference in its entirety: U.S. patent application Ser. No. 11/335,278, filed by Best et al. on Jan. 19, 2006 and published as U.S. Pat. App. Pub. No. 2007/016889A1 on Jul. 19, 2007.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

Exemplary embodiments of the present invention generally relate to user feedback within a graphical user interface, and, more particularly, to a system, method, and computer program product for indicating the default value for a property of an object within a graphical user interface.

2. Description of Background

A graphical user interface (or GUI) is used to bring structure to the interaction between a user and a computer system by providing a program or a set of programs that sits as a layer above the operating system itself. A GUI typically employs graphical icons, visual indicators, or special graphical elements called "widgets" or controls, along with text labels or text navigation, to represent the information and actions available to a user. The actions are usually performed through direct manipulation of the graphical elements. Such interfaces provide a natural and intuitive technique for a user to be able to manipulate files, programs, and utilities within a modern computer system without requiring the user to enter complex command sequences.

A property viewer is a GUI component that displays the properties, attributes, or details of an object or an arrangement of data. It is sometimes referred to as an attributes or a details viewer. A typical property viewer presents a table for each object, with the type of the input object determining what properties are to be displayed. The table typically has two columns, with cells in the first column setting forth the names of the properties, and cells in the second column describing the current values of idle named properties. Generally, a property viewer will provide a means of editing the values for the object's properties.

A default refers to a setting or value that is automatically assigned to a property of an object, prior to or outside of user intervention. Default values are generally intended to make application software usable "out of the box" by initializing objects with common or usable settings. In a typical software package, the default values for an object's properties will be set to the most commonly selected options to minimize user interaction. Alternatively, some software packages require that default values be supplied. Generally, an application will employ certain GUI elements such as property viewers that allow a user to edit property information to change values from their default setting, as well as to change the assigned value that is used for a default setting. Property viewers may also provide a user with the option of causing properties with user-set values to reset or revert to their default values.

Nevertheless, the use of defaults will tend to increase errors, as users may leave incorrect default settings selected. The inventors herein have recognized that this is particularly a problem when a user is not aware of whether a current property value is a default value or a user-set value, or of the value assigned as the default value when the current property value is user-set. For instance, where a user is unfamiliar with the default value for a property having a user-set value and the user causes the property to revert to the default value, the default value for the property is not known by the user until the reversion. If the user had expected the default setting to be a different value, the user may prefer to have the property return to the previous user-set value. The previous value, however, may have been erased by the reversion to default, and therefore the prior setting will be lost if the user does not recall the exact value.

Accordingly, the inventors herein have recognized a need for providing feedback regarding the default values of an object's properties to the user of a GUI component that allows a user to edit the object's property information.

SUMMARY OF THE INVENTION

Exemplary embodiments of the present invention relate to a system for indicating a default value for a property of a selected object to a user within a graphical user interface (GUI) of a program module. The property has a value and a state that can be set. The state of the property is one of a default state and a user-set state. The value of the property is assigned the default value when the state is the default state. The system comprises a GUI control having first, second, and third interface elements. The first interface element is configured to indicate the value of the property to the user. The second interface element is configured to indicate the state of the property to the user. The third interface element is configured to indicate the default value for the property to the user when the state of the property is the user-set state.

Exemplary embodiments of the present invention also relate to method and computer program products corresponding to the above-summarized system.

For a better understanding of exemplary embodiments of the present invention with advantages and features, refer to the description and to the drawings.

TECHNICAL EFFECTS

Exemplary embodiments of the present invention achieve a solution that provides enhanced feedback to the user regarding the default values for properties of an object within a graphical user interface component that allows the user to edit the object's property information.

BRIEF DESCRIPTION OF THE DRAWINGS

The subject matter which is regarded as the invention is particularly pointed out and distinctly claimed in the claims at the conclusion of the specification. The foregoing and other objects, features, and advantages of exemplary embodiments of the present invention are apparent from the following detailed description taken in conjunction with the accompanying drawings in which:

The detailed description explains exemplary embodiments of the present invention, together with advantages and features, by way of example with reference to the drawings, in which like numbers refer to like elements throughout.

DETAILED DESCRIPTION OF THE INVENTION

Exemplary embodiments of the present invention will now be described in detail herein with reference to the accompanying drawings, in which exemplary embodiments of the invention are shown. Variations of the present invention may, however, be embodied in many different forms and, therefore, the present invention should not be construed as being limited to the exemplary embodiments set forth herein; rather, these embodiments are provided so that this disclosure will be thorough and complete, and will fully convey the scope of the invention to those skilled in the art.

Figure 1:
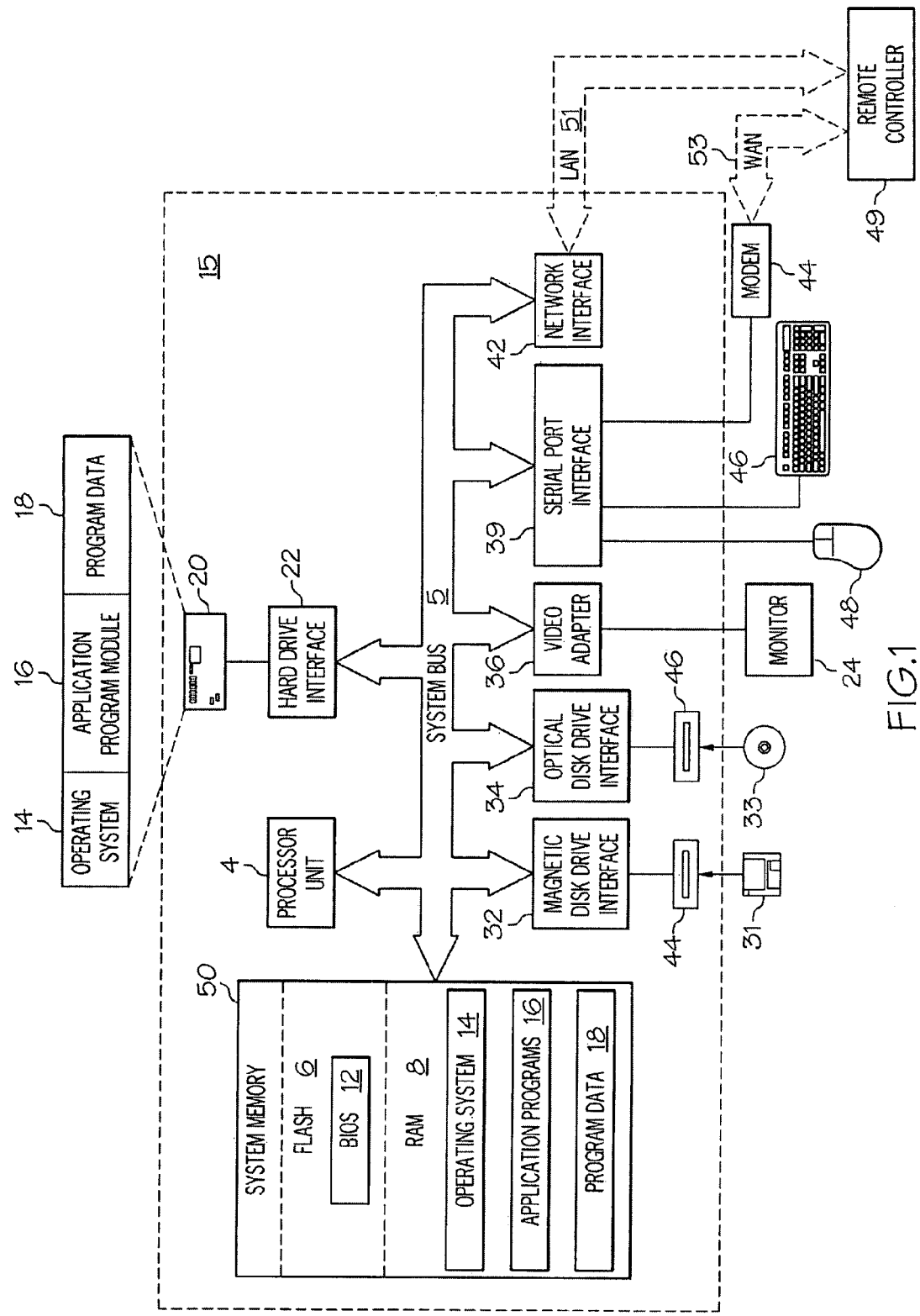
FIG. 1 illustrates one exemplary computer system that may be utilized to implement exemplary embodiments of the present invention.

FIG. 1 and the following discussion are intended to provide a brief, general description of an exemplary data processing system adapted to implement exemplary embodiments of the present invention. While exemplary embodiments of the present invention will be described in the general context of an application program that runs on an operating system in conjunction with a personal computer, those skilled in the art will recognize that they also may be implemented in combination with other program modules such as, for example, platform software modules, user-written software modules (such as spreadsheet templates, word processor macros, graphics scripts, etc.), routines, programs, components, data structures, etc. that perform particular tasks or implement particular abstract data types. Moreover, those skilled in the art will appreciate that exemplary embodiments of the present invention may be practiced with other computer system configurations, including hand-held devices, multiprocessor systems, microprocessor-based or programmable consumer electronics, minicomputers, mainframe computers, and the like, as well as in distributed computing environments where tasks are performed by remote processing devices that are linked through a communications network. In a distributed computing environment, program modules may be located in both local and remote memory storage devices.

With reference now to FIG. 1, there is depicted an exemplary data processing system 15 that may be utilized to implement exemplary embodiments of the present invention. For discussion purposes, the data processing system is described as having features common to a personal computer, such as a desktop or portable computer. As used herein, however, the terms "data processing system," "computer," and the like are intended to mean essentially any type of computing device or machine that is capable of receiving, storing, and running a software product, including such devices as communication devices (for example, pagers, telephones, electronic books, electronic magazines and newspapers, etc.) and personal and home consumer devices (for example, handheld computers, Web-enabled televisions, home automation systems, multimedia viewing systems, gaining consoles, etc.).

Data processing system 15, as provided in FIG. 1, is configured as a personal computer that generally includes a processing unit 4, a system memory 50, and a system bus 5 that couples system memory 50 to processing unit 4. The system memory 50 includes flash memory 6 and random access memory (RAM) 8. Flash memory 6 is an electrically erasable programmable read only memory (EEPROM) module that includes a basic input/output system (BIOS) 12. BIOS 12 contains the basic routines that facilitate transfer of information between elements within personal computer 15, such as during start-up.

Data processing system 15 further includes a hard disk drive 20, a magnetic disk drive 44 (which can be used to read from or write to a removable disk 31), and an optical disk drive 46 (which can be used to read a CD-ROM disk 33 or read or write to other optical media). Hard disk drive 20, magnetic disk drive 44, and optical disk drive 46 are communicatively coupled to system bus 5 by a hard disk drive interface 22, a magnetic disk drive interface 32, and an optical drive interface 34, respectively. The drives and their associated computer-readable media provide nonvolatile storage for data processing system 15. Although the description of computer-readable media above refers to a hard disk, a removable magnetic disk and a CD-ROM disk, it should be appreciated by those skilled in the ale that other types of media that are readable by a computer, such as magnetic cassettes, flash memory cards, digital video disks, Bernoulli cartridges, and the like, may also be used in the exemplary computer operating environment.

A number of program modules may be stored in the drives and RAM 8, including an operating system 14, application program modules 16 (such as, for example, word processors, design applications, and IBM's Workplace Forms suite of program modules), and program data 18. A user may enter commands and information into data processing system 15 through a keyboard 46 and a mouse 48. Other input devices (not shown) may include, for example, a microphone, joystick, game pad, satellite dish, scanner, or the like. These and other input devices are often connected to processing unit 4 through a serial port interface 39 that is coupled to system bus 5, but may be connected by other interfaces, such as a game port or a universal serial bus (USB). A monitor 24 or other type of display device is also connected to system bus 5 via an interface, such as a video adapter 36. In addition to the monitor, the exemplary computer operating environment may also include other peripheral output devices (not shown), such as speakers or printers.

Data processing system IS may operate in a networked environment using logical connections to one or more remote computers, such as a remote computer 49. Remote computer 49 may be, for example, a server, a router, a peer device, or another common network node, and may include many or all of the elements described in relation to data processing system 15. The logical connections depicted in FIG. 1, include a local area network (LAN) 51 and a wide area network (WAN) 53.

When used in a LAN networking environment, data processing system 15 is connected to LAN 51 through a network interface 42. When used in a WAN networking environment, data processing system 15 includes a modem 44 or other means for establishing communications over WAN 53, such as the Internet. Modem 44, which may be internal or external to data processing system 15, is connected to system bus 5 via serial port interface 39. In a networked environment, program modules depicted relative to data processing system 15, or portions thereof, may be stored in the remote memory storage device. It will be appreciated that the network connections shown are exemplary and other means of establishing a communications link between the computers may be used.

Figure 2:
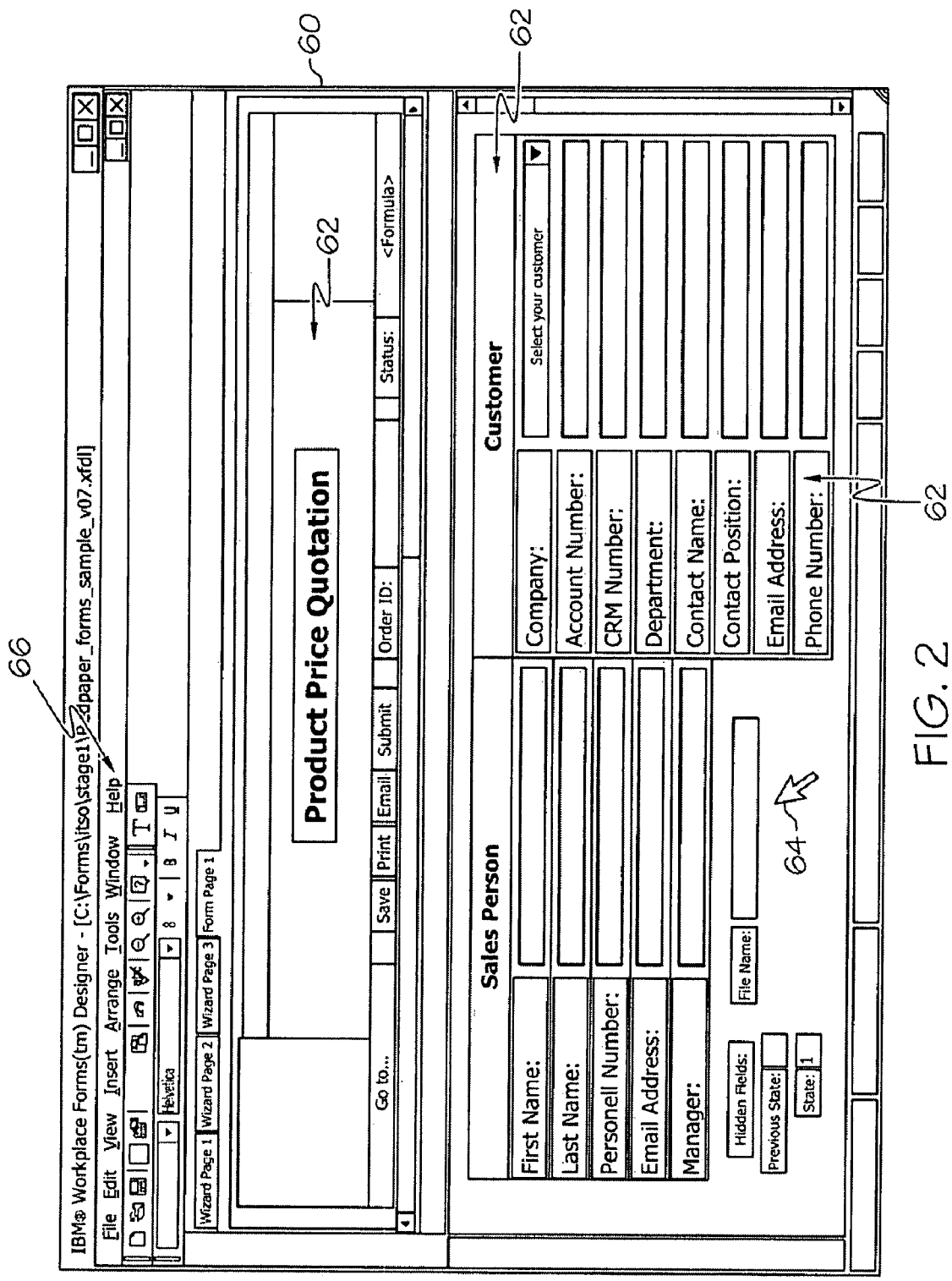
FIG. 2 depicts a pictorial representation of one exemplary computer application in which exemplary embodiments of the present invention may find application.

Referring now to FIG. 2, there is depicted a pictorial representation, which may be displayed within monitor 24 of FIG. 1 for example, from a graphical user interface (GUI) of an exemplary computer application in which exemplary embodiments of the present invention may be implemented. As illustrated, an application window 60 depicts a program for creating and designing electronic form documents that can be used for capturing structured data.

In the present exemplary embodiment, during document design, form objects 62 may be placed, edited, and stored in application window 60 for future utilization. A pointer or cursor 64 is depicted as a graphical image in application window 60 that indicates the location of a pointing device. Pointer 64 appears as an angled arrow, but its appearance can vary within in exemplary embodiments. Pointer 64 is provided to select and move objects or commands on the given screen upon detecting an input from the user at, for example, keyboard 46, mouse 48, or any other suitable user input device. For example, pointer 64 can used to indicate the location at which form objects or text would be entered or selecting for editing. For example, mouse 48 can be used to move pointer 64 over a form object and then clicked to select the object. A menu bar 66 is displayed horizontally across the top of the window. When a user clicks on a menu option from menu bar 66, a pull-down menu will appear.

Figure 3:
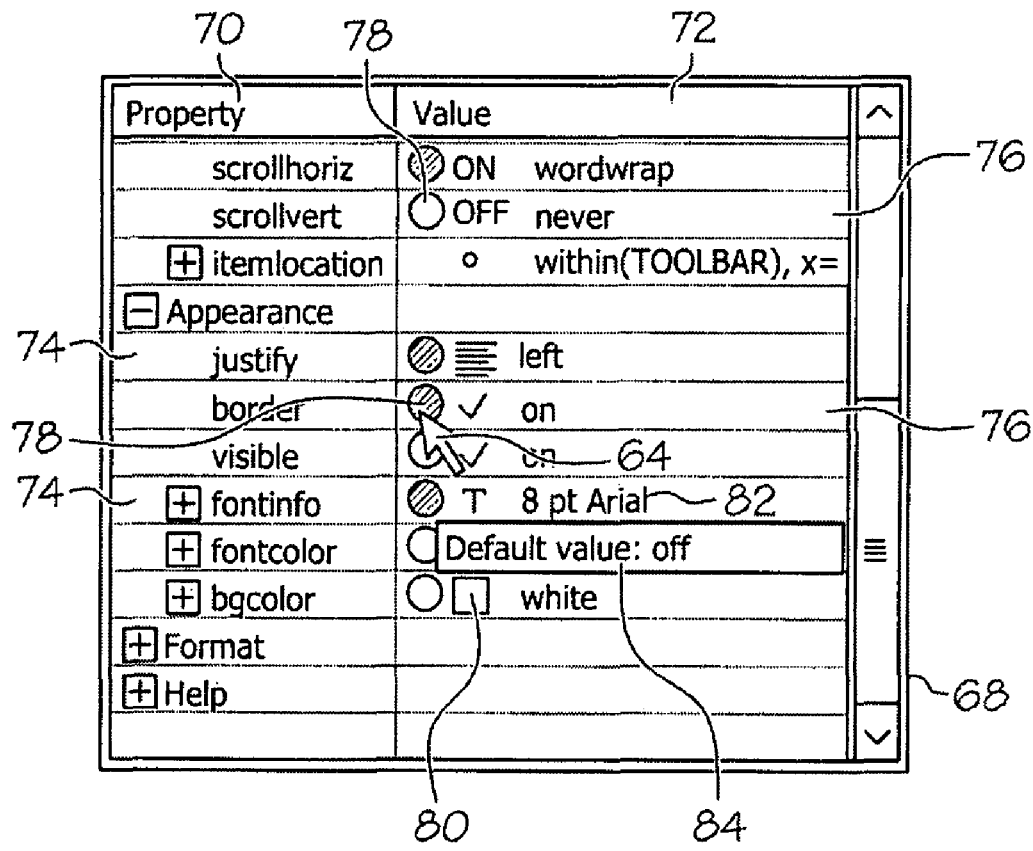
FIG. 3 depicts a pictorial representation of a utility window in accordance with an exemplary embodiment of the present invention.

With reference now to FIG. 3, there is depicted an exemplary embodiment of a utility window 68 from the GUI of the exemplary computer application illustrated in FIG. 2. At this point, the user has likely taken some action which has resulted in the display of utility window 68, such as, for example, using mouse 48 to select a form object, then moving pointer 64 to menu bar 66 and clicking a menu option, and then selecting an item within the pull-down menu that appears. In exemplary embodiments, utility window 68 can be displayed in a number of ways, such as a pop-up window or integrated as part of application window 60 similarly to menu bar 66 at the top of application window 60. Utility window 68 provides a property viewer that displays the properties of a selected form object and allows to the user to edit the current values of these properties. In the grid of utility window 68, a first column 70 provides cells 74 that list the names of the properties of the selected object that may be edited, and a second column 72 provides corresponding cells 76 that describe the values of the named properties.

The displayed properties and their corresponding values describe the appearance, behavior, and actions of the selected form object. In exemplary embodiments, the selected form object can be, for example, a form object for the properties of the form itself (each form may have one form object with a set of global properties for the whole document), a page object (the properties for which control the background appearance and how items are displayed for a page of the form), or a form item (that is, one of the objects that appears on a page and constitute the form content such as, for example, a field, label, or button). Form items can include, for example, toolbars, tables, fields, buttons, lists and choices, graphics, items from a standard library, and other predefined objects or collections of objects. In exemplary embodiments, the list of properties displayed will vary depend on the type of form object that is selected. For instance, a user can edit the property values in utility window 68 to set the color and font of a selected object's text label, the action triggered by the selected object's button(s), the background color of the selected object, etc.

In the present exemplary embodiment, column 70 presents cells 74 as nodes in a tree or outline view to provide a hierarchical view of the properties of the currently selected form object. Each property cell or node can encompass a number of subproperties, as visualized by indentation in column 70. A property node can be expanded to reveal subproperties, if any exist, and collapsed to hide subproperties. For instance, as depicted in FIG. 3, property node 'Appearance' has been expanded to reveal object properties 'justify', 'border', and 'visible', while property node 'Format' is shown as being collapsed.

Cells 76 of column 72 describe the values and settings for each corresponding property listed in column 70. Each cell contains a default toggle selection button 78, a value icon 80, and a value caption 82. Each value icon 80 is shown as a small pictograph used to display a representation of the current value of the corresponding property to provide a pictorial explanation to the user. Visually, the pictograms can take several forms, depending on the form objects and/or properties to which they apply. Each value caption 82 displays the name of the current value of the corresponding property to the user in a textual representation. In the present exemplary embodiment, both value icons 80 and value captions 82 allow for the user to edit the current value by moving pointer 64 over either representation and clicking to open editing functionality. In exemplary embodiments, this editing interaction can be triggered by other user interaction, such as double-clicking or right clicking either the value icons 80 or value captions 82. In exemplary embodiments, this editing interaction can be provided to the user in the form of another GUI widget such as, for example, a list box, a drop-down list, another window or dialog box, or any other suitable interface control. In exemplary embodiments, the GUI widget for editing can be embedded within utility window 68 or can comprise a separate GUI window or box that is opened.

In the present exemplary embodiment, cells 76 each contain default button 78 to provide feedback to the user to increase the user's understanding of the state of the corresponding property listed in column 70. The encircled area for each default button 78 toggles between displaying white space and a dot having another color (for example, blue, green, black, etc.) to indicate to the user whether the current value of the corresponding property, as displayed by that cell's value icon and value caption, has been set to the default state to take the assigned default value, or has been set to a user-set state by the user. Each default button 78 allows for the user to toggle the current state of the property by moving pointer 64 over the button and clicking.

Thus, when a default button indicates the corresponding property is in a user-set state (with a colored dot), for example, the user can reset the property to the default state by clicking the button, which will also have the effect of changing the encircled area to white space and changing the property value to the default value. In exemplary embodiments, the assigned values corresponding to default states need not be static. For instance, a default value may be calculated based upon the current values of other properties in the system, or a default value for a property of a form item may be assigned according to global form or page object properties. Thus, the default values for properties may change when the user edits other properties in the system, which will have the effect of modifying the values for the properties when they are in the default state.

Likewise, when a default button indicates the corresponding property is in the default state, the user can click the button to modify the state to the user-set state. In this state, the corresponding property's value can remain equivalent to the assigned value for the default state or to a modified value as set by the user, even as the user edits other properties. For example, if the selected form object is a page object, the background color property for the page is in the default state with a default value of white, and the user clicks the default button, the background color will remain white but the default button will toggle to indicate the state of the property has become user-set. Since the property's value does not change in this scenario, the user will know what the property value will be after clicking the default button. Furthermore, for properties for which the assigned value for the default state is based upon current values of the other properties in the system, the user will know that the property value will not change as other property values in the system change when the property state is toggled to the user-set state.

Nevertheless, when a default button indicates that a corresponding property is in a user-set state and the user clicks the default button to change the property's state to the default state, the property's value will reset to the default value, and the value of the prior user-set state will no longer be indicated to the user by the corresponding value icon and the value caption. Thus, a user should be provided with an indication of the default value for the property before the user clicks the default button to switch the property from the user-set state to the default state so that the user can be sure that the preferred action is to remove the current user-set value and return to the default value. Such an indication can be particularly useful when the default value is not static, as described above.

In the present exemplary embodiment, the indication of a default value for a property is provided to the user with the addition of a flyover tooltip or balloon caption 84 that provides a textual representation of the assigned default value when the user hovers pointer 64 over a corresponding default button that is currently in a user-set state. For example, as depicted in FIG. 3, with the user having moved pointer 64 over the default button for the 'border' property, a small text box appears explaining the default value (i.e., border 'off') for the 'border' property while pointer 64 hovers over the default button. This solution will provide the user with the default value without before the user clicks the default button by having the user move the mouse over the default button, thereby providing the user with more feedback before the user determines whether to click the default button.

In exemplary embodiments, the technique used to display the default value can vary and thus should not be interpreted as being limited to a single embodiment. For instance, with reference now to FIG. 4, there is depicted an alternative exemplary embodiment of a utility window 168 from the GUI of the exemplary computer application illustrated in FIG. 2. Like the exemplary embodiment shown in FIG. 3, when toggled to the default state, the encircled area of each default button 178 renders a specific representation to indicate that it is in the default state to the user (for example, a single color or an icon). In the exemplary embodiment of FIG. 4, however, when toggled to the user-set state, the encircled area of each default button 178 changes to white space while rendering a symbol 186 that visibly indicates the default value to the user (for example, a color, text, an icon, etc.). Because the default values for each non-collapsed property will thus be continually visible in utility window 168 (displayed either by an icon on the default button when in the user-set state or by the property's value icon 180 and value caption 182 when in the default state), the user can quickly and easily glance down the list of properties to see the default values.

Figure 4:
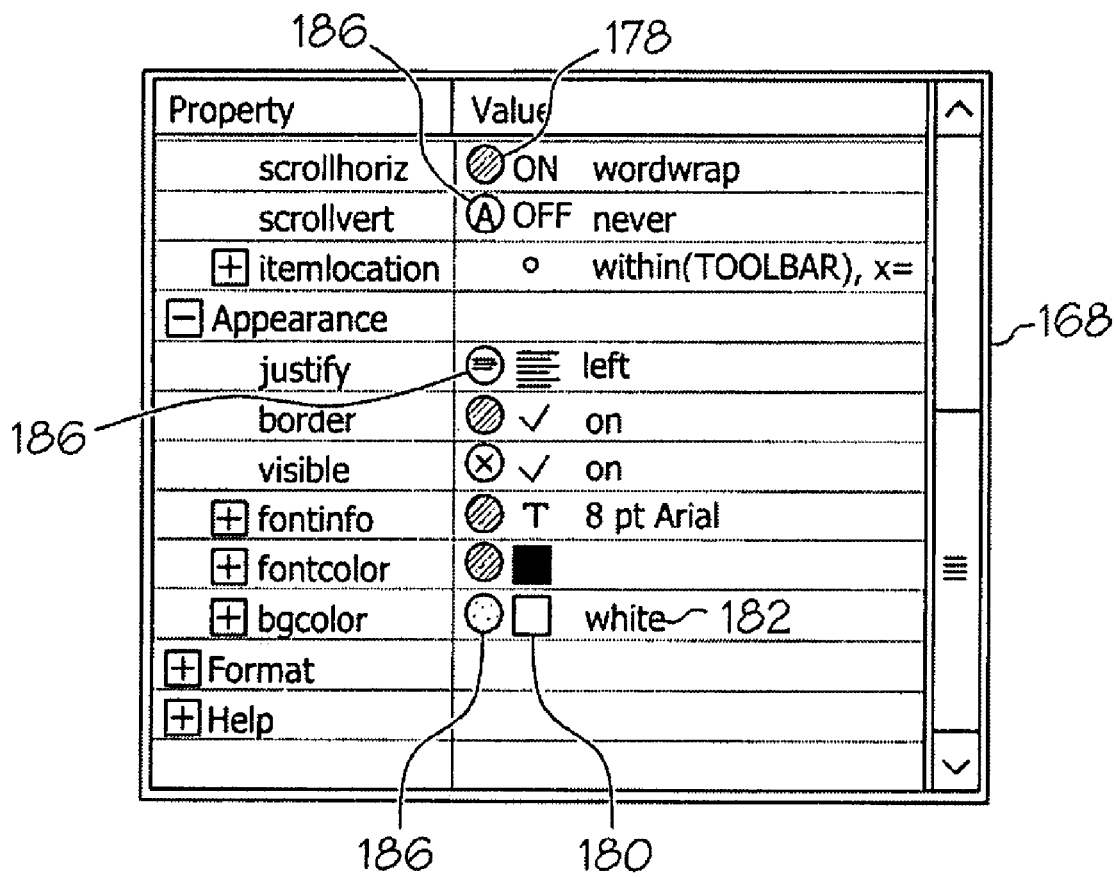
FIG. 4 depicts a pictorial representation of a utility window in accordance with an alternative exemplary embodiment of the present invention.

For example, if the selected object is a text object, the justification property for the text is in the default state with a default value of left-justification, and the user clicks the default button, the text justification will remain left-justified but the default button will toggle to indicate that the state of the property has become user-set and render a symbol indicating that the default value is left-justification within the encircled area (for example, by the icon of cells 176 shown in FIG. 4 that corresponds to the 'justify' cell of property cells 174 or by the letter 'L'). This symbol will remain within the encircled area to inform the user the value that the property will take if the user clicks the default button even if the user, for example, changes the text justification property to right-justification.

Therefore, exemplary embodiments of the present invention can be implemented to provide more feedback regarding the default value for an object's properties to the user. For instance, exemplary embodiments can allow a user to determine the default value for a property, determine whether a property that set to a value equivalent to the default value is in the default state or a user-set state, and to determine whether it is preferable to toggle a property from a user-set state to the default state prior to clicking the default button.

The utility windows for the exemplary embodiments described above are taken from embodiments of IBM Workplace Forms Designer, a drag-and-drop design application that allows form designers to create detailed, functional electronic forms. It should be noted, however, that exemplary embodiments of the present invention can implemented in any program module that utilizes property values such as, for example, other design applications, word processors, spreadsheets, computer games, office suites, compilers, operating systems, industrial automation, business software, educational software, medical software, databases, etc. Moreover, exemplary embodiments can implemented as a component of a software library for use by stand-alone applications.

As will be appreciated by one of skill in the art, exemplary embodiments of the present invention may be embodied and implemented as a computational method, data processing system, or computer program product. Accordingly, exemplary embodiments may take the form of an entirely hardware embodiment, an entirely software embodiment, or an embodiment combining software and hardware aspects. Additionally, at least one program storage device readable by a computer or other programmable data processing apparatus or machine that tangibly embodies at least one program of instructions executable by the machine to direct the machine to perform the capabilities of exemplary embodiments the present invention can be provided.

For example, one or more aspects of exemplary embodiments of the present invention can be included in an article of manufacture (for example, one or more computer program products) having, for instance, computer usable media. The media has embodied therein, for instance, a computer program product having computer-usable program code that can direct a computer or other programmable data processing apparatus to function in a particular manner, such that the instructions stored in the computer-readable memory produce an article of manufacture that implements the capabilities of the present invention. The article of manufacture can be included as a part of a computer system or sold separately. Any suitable computer readable media may be utilized in exemplary embodiments including hard disks, CD-ROMs, optical storage devices, a transmission media such as those supporting the Internet or an intranet, or magnetic storage devices.

Computer program code for carrying out operations of exemplary embodiments of the present invention may be written in an object oriented programming language such as Java, Smalltalk or C++. The computer program code, however, may also be written in conventional procedural programming languages, such as the "C" programming language. The program code may execute entirely on the user's computer, partly on the user's computer, as a stand-alone software package that runs partly on the user's computer and partly on a remote computer, or entirely on the remote computer. In the latter scenario, the remote computer may be connected to the user's computer through a local area network (LAN) or a wide area network (WAN), or the connection may be made to an external computer (for example, through the Internet using an Internet Service Provider).

While exemplary embodiments of the present invention have been described above, it should be understood that they have been presented by way of example, not limitation, and that variations are possible. Thus, the breadth and scope of the present invention should not be limited by any of the above-described exemplary embodiments, but should be defined only in accordance with the following claims and their equivalents.

What is claimed is:

1. A system for indicating a default value for a property of a selected object to a user within a graphical user interface (GUI) of a program module, the property having a value and a state that can be set, the state of the property being one of a default state and a user-set state, the value of the property being assigned the default value when the state is the default state, the system comprising:
    a processor;
    a display device coupled to the processor and presenting a GUI control having first, second, and third interface elements, the first interface indicating the value of the property to the user, the second interface element indicating the state of the property to the user, the third interface element including a tool that causes a representation of the default value for the property to the user to be presented in a balloon caption when a selection element of the GUI control is positioned over the second interface element at the same time the first interface element is indicating a user selected value other than the default value;
    wherein the first interface element can be accessed by the user to modify the value of the property, the first interface element being configured to set the state of the property to the user-set state upon modification of the value of the property by the user;
    wherein the second interface element can be accessed by the user to set the state of the property to the user-set state from the default state and to reset the state to the default state from the user-set state; and
    wherein the second interface element comprises a toggle configured to be triggered by the user to set or reset the state of the property, the toggle being configured to set the state of the property to the user-set state upon being triggered by the user when the state is the default state, the toggle being configured to reset the state of the property to the default state upon being triggered by the user when the state is the user-set state.

2. The system of claim 1, wherein the third interface element is configured to provide a small window within the GUI control indicating the default value for the property when the state of the property is the user-set state.

3. The system of claim 1, wherein the third interface element is configured to provide a graphical symbol within the GUI control indicating the default value for the property when the state of the property is the user-set state.

4. The system of claim 1, wherein the user triggers the toggle to set or reset the state of the property using a graphical element within the GUI that is responsive to an input signal from the user input device.

5. The system of claim 4, wherein the user input device comprises a keyboard.

6. The system of claim 4, wherein the graphical element comprises a graphical pointer.

7. The system of claim 6, wherein the toggle comprises a GUI command button, the GUI command button being configured to display a first color in an encircled area when the state of the property is the default state and to display a second color in the encircled area when the state of the property is the user-set state.

8. The system of claim 7, wherein the user input device comprises a mouse, and wherein the user triggers the GUI command button by clicking the mouse while hovering the graphical pointer over the GUI command button.

9. The system of claim 8, wherein the third interface element is configured to display a graphical symbol indicating the default value for the encircled area of the GUI command button when the state of the property is the user-set state.

10. The system of claim 8, wherein the third interface element is configured to display a small window indicating the default value for the property to the user while the user hovers the graphical pointer over the encircled area of the GUI command button when the state of the property is the user-set state.

11. The system of claim 10, wherein the small window is a GUI widget selected from a tooltip, a status bar, and a balloon caption.

12. The system of claim 1, wherein the GUI includes a property interface within which the GUI control is implemented, the property interface being configured to provide a description a plurality of object properties for the selected object within a table, the table having first and second columns and a row for each object property of the plurality of object properties, each row including a first cell in the first column configured to indicate a name for the corresponding object property, each row including a second cell in the second column configured to indicate a current value for the corresponding object property.

13. The system of claim 1, wherein the GUI control is implemented as a function provided to the program module from a GUI library.

14. The system of claim 1, wherein the GUI control is implemented as a function within the program module.

* * * * *